US010600209B2

(12) United States Patent
Liu et al.

(10) Patent No.: US 10,600,209 B2
(45) Date of Patent: Mar. 24, 2020

(54) CALIBRATION METHOD FOR A CAMERA WHICH MONITORS A TARGET BOARD

(71) Applicant: NVTEK ELECTRONIC CO., LTD., Zhubei (TW)

(72) Inventors: Chin-Wei Liu, Hsinchu County (TW); Wen-Chih Teng, Zhubei (TW)

(73) Assignee: NVTEK Electronic Co., Ltd., Hsinchu County (TW)

( * ) Notice: Subject to any disclaimer, the term of this patent is extended or adjusted under 35 U.S.C. 154(b) by 108 days.

(21) Appl. No.: 15/869,257

(22) Filed: Jan. 12, 2018

(65) Prior Publication Data

US 2018/0253864 A1     Sep. 6, 2018

(30) Foreign Application Priority Data

Mar. 3, 2017   (GB) .................................. 1703459.6

(51) Int. Cl.
*G06T 7/80*     (2017.01)
*F41J 5/10*     (2006.01)
(Continued)

(52) U.S. Cl.
CPC ............... *G06T 7/80* (2017.01); *A63B 67/06* (2013.01); *A63F 9/0278* (2013.01); *F41J 5/02* (2013.01);
(Continued)

(58) Field of Classification Search
CPC ....... F41J 5/02; F41J 5/10; G06T 3/60; G06T 3/20; G06T 7/73; G06T 7/80; G06T 7/11;
(Continued)

(56) References Cited

U.S. PATENT DOCUMENTS 4,789,932 A * 12/1988 Cutler .................... F41J 5/02
                                                   250/206.1
8,570,499 B2 * 10/2013 Walti-Herter ............ G01V 8/20
                                                   273/371
(Continued)

FOREIGN PATENT DOCUMENTS

GB       2542108 A       3/2017
TW     201712294 A       4/2017

OTHER PUBLICATIONS

U.S. Appl. No. 62/325,500 from US PG pub 2017/0307341, published Apr. 21, 2016 (Year: 2016).*

Primary Examiner — Michael A Cuff
(74) Attorney, Agent, or Firm — Rosenberg, Klein & Lee

(57) ABSTRACT

A calibration method for a camera which monitors a target board is disclosed, comprising steps: using the camera to capture a target image corresponding to the target board; using rotation and translation to align the target image to a reference standard and acquire the corresponding relationship of the target image and the target board; defining a region of interest above the target image; using at least one positioning marker in at least two positions of the target board, whose actual space coordinates are known, and using the camera to acquire at least two image coordinates of the positioning markers in the region of interest; and using the known actual space coordinates and the acquired image coordinates to work out the exact position of the camera. Thereby, the positions of the cameras can be used to correctly determine the positions of darts.

10 Claims, 7 Drawing Sheets

(51) Int. Cl.
*F41J 5/02* (2006.01)
*G06T 7/11* (2017.01)
*G06T 7/73* (2017.01)
*A63B 67/06* (2006.01)
*A63F 9/02* (2006.01)
*G06T 3/20* (2006.01)
*G06T 3/60* (2006.01)

(52) U.S. Cl.
CPC .................. *F41J 5/10* (2013.01); *G06T 3/20* (2013.01); *G06T 3/60* (2013.01); *G06T 7/11* (2017.01); *G06T 7/73* (2017.01); *A63F 2009/0221* (2013.01); *G06T 2207/30204* (2013.01); *G06T 2207/30244* (2013.01)

(58) Field of Classification Search
CPC . G06T 2207/30204; G06T 2207/30244; A63F 9/0278; A63F 2009/0221; A63B 67/06
USPC ........................................................... 463/7
See application file for complete search history.

(56) References Cited

U.S. PATENT DOCUMENTS

| | | | |
|---|---|---|---|
| 2006/0061039 A1* | 3/2006 | Pan | F41J 3/0019 273/371 |
| 2016/0373682 A1 | 12/2016 | DeAngelis | |
| 2017/0191805 A1* | 7/2017 | Teng | F41J 5/02 |
| 2017/0307341 A1* | 10/2017 | Hollinger | A63F 11/0051 |
| 2018/0202775 A1* | 7/2018 | Ghani | F41J 5/10 |

* cited by examiner

CALIBRATION METHOD FOR A CAMERA WHICH MONITORS A TARGET BOARD

This application claims priority for United Kingdom patent application no. 1703459.6 filed on Mar. 3, 2017, the content of which is incorporated by reference in its entirety.

BACKGROUND OF THE INVENTION

Field of the Invention

The present invention relates to a calibration method, particularly to a method for calibrating the position of a camera which monitors a target board before a dart-like game is scored.

Description of the Related Art

Consumers can play electronic dart-like games easily and enjoy fun of competition. Many marts, restaurants and bars provide electronic dart-like game machines, such as archery game machines and electronic dart machines, for amusement or competition. Further, the tournaments thereof are held periodically.

In the electronic dart machines using soft darts, electronic components are installed in the dartboard to sense the position of a dart with various detection methods. There is also a hard type dart, which is used in formal dart tournaments. The dartboard of the hard type dart is made of flax fiber. The flax fiber is shaped via squeezing and then fixed by iron hoops. While a dart is pulled out from the dartboard made of flax fiber, the hole will close spontaneously. The service life of the dartboard made of flax fiber is much longer than the dartboards made of other materials. However, sensing electronic components are unlikely to be installed in the dartboard made of flax fiber. Thus, the hard type dart is scored manually in tradition. Currently, computerized scoring, which uses cameras to capture the positions where the darts hit the dartboard, has been gradually popularized in the field. The precision of the positions of the cameras will influence the accuracy of scoring. Normally, several cameras are disposed in the periphery of a dartboard to cover the entire dartboard and aligned parallel to the dartboard to acquire the impact points of the darts for scoring. Aligning the cameras parallel to the dartboard is very important for correct scoring.

While the cameras of the electronic dart machine are installed initially, the cameras need calibration. While the positions or angles of the cameras are varied by movement or vibration, the cameras need calibration also. The traditional method to calibrate the cameras is adjusting the cameras to optimized positions and angles. However, the traditional calibration method is hard to practice because of fabrication tolerance and shape distortion of the cameras. The positional errors of the cameras would significantly affect the accuracy in determining the positions of the darts.

Accordingly, the present invention proposes a calibration method for a camera which monitors a target board to solve the conventional problems.

SUMMARY OF THE INVENTION

The primary objective of the present invention is to provide a calibration method for a camera which monitors a target board, which converts a 3D relationship into a 2D problem, uses the information of known actual space coordinates and the information of image coordinates to work out the precise positions of the cameras, and uses the positions of the cameras to determine the positions of darts accurately, whereby to avoid scoring error and improve scoring accuracy.

In order to achieve the abovementioned objective, the method of the present invention respectively calibrates at least two cameras in the periphery of the target board. The process of calibrating each camera comprises steps: firstly using the camera to acquire a target image of a target board; using rotation, translation, etc. to align the target image to a reference standard and acquire the corresponding relationship of the target image and the target board; defining a region of interest above the target image; inserting at least one positioning marker in at least two positions of the target board, whose actual space coordinates are known; using the camera to acquire at least two image coordinates of the positioning markers with respect to the region of interest; using at least two known actual space coordinates and the acquired at least two image coordinates to work out the positions of the camera.

In the present invention, the reference standard is a reference line or at least two reference points.

Below, embodiments are described in detail in cooperation with the attached drawings to make easily understood the objectives, technical contents, and accomplishments of the present invention.

DETAILED DESCRIPTION OF THE INVENTION

Figure 1:
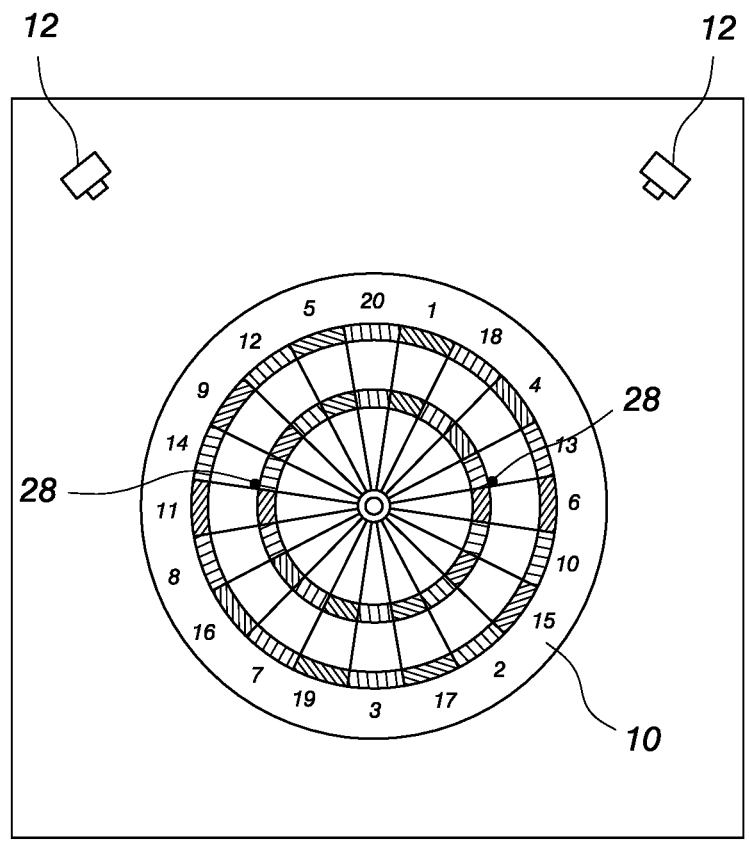
FIG. 1 is a diagram schematically showing the structure of a target system used by a calibration method according to one embodiment of the present invention.

The present invention proposes a method to calibrate a camera which monitor a target board before a dart-like game is scored. Refer to FIG. 1. At least two cameras have been installed in the periphery of a target board 10. In this embodiment, two cameras 12 are used to exemplify the cameras. The cameras 12 are parallel to the target board 10 and cover the corresponding actual space coordinates. The imaging coverage of the cameras 12 includes the entire target board 10. The target board 10 is an archery target board or a dart target board. In the case of a dart target board, the target board 10 may be a target board for soft type darts or hard type darts. In other words, the method of the present invention is applicable to all target boards needing camera calibration.

Figure 2:
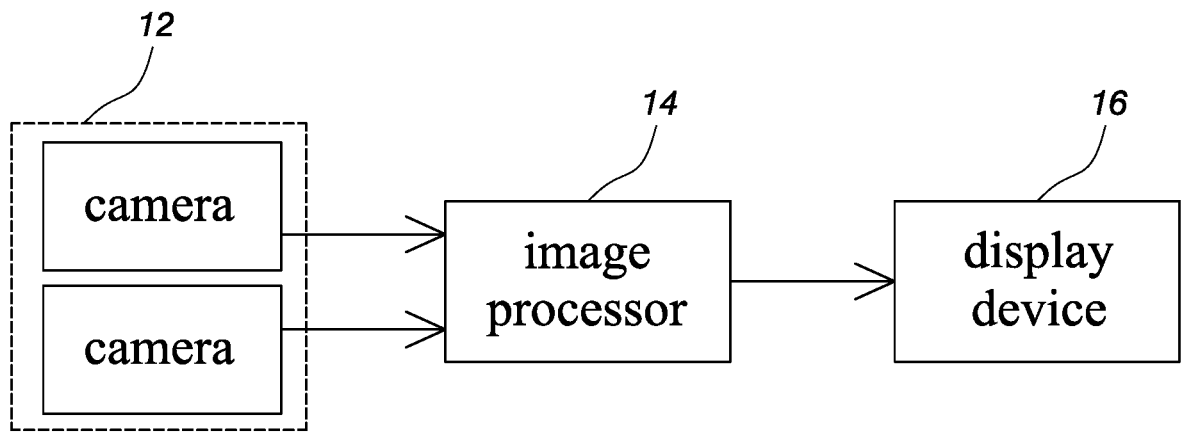
FIG. 2 is a block diagram schematically showing a system used by a calibration method according to one embodiment of the present invention.

Refer to FIG. 2, a block diagram schematically showing a system used by the method of the present invention. The camera 12 captures the target image corresponding to the target board and transmits the target image to an image processor 14 where all calibration calculations are undertaken. A display device 16 is electrically connected with the image processor 14 and presents all the images or the calibration process.

Figure 3:
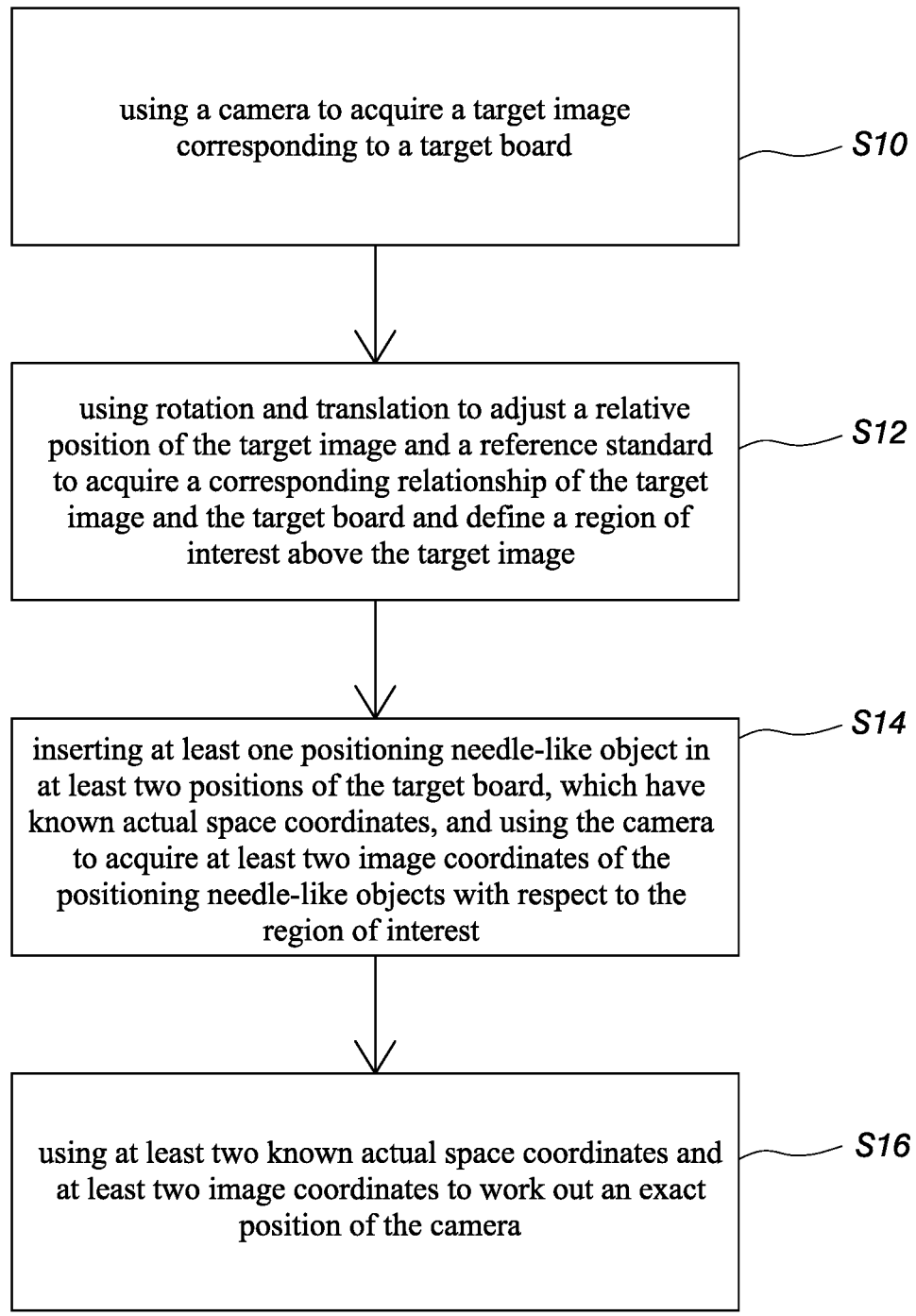
FIG. 3 is a flowchart showing the steps of a calibration method according to one embodiment of the present invention.
Figure 4A:
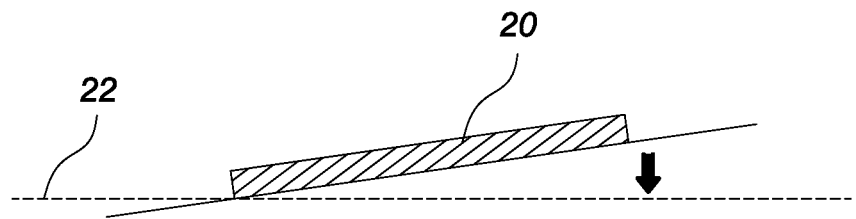
FIGS. 4a-4d the steps of sequentially using rotation and translation with respect to a reference line for calibration according to one embodiment of the present invention.
Figure 4B:
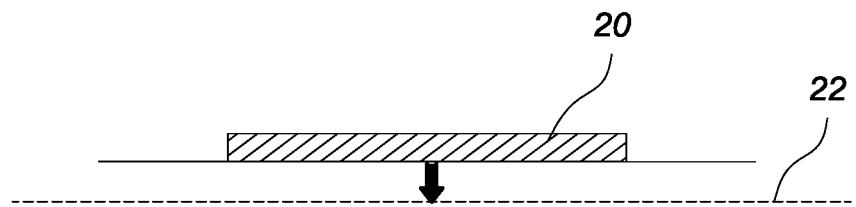
Figure 4C:
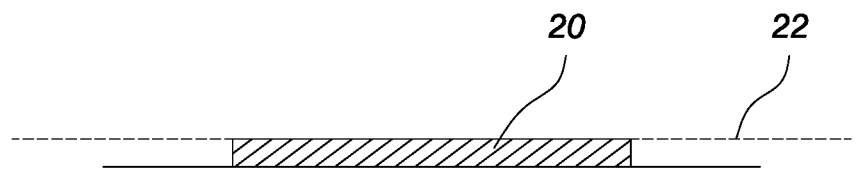
Figure 4D:
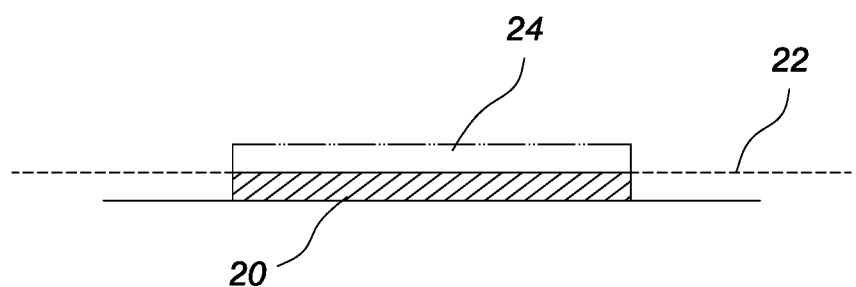

Refer to FIG. 3 a flowchart showing the steps of the calibration method of the present invention. Refer to FIG. 1 and FIG. 2 also. The method of the present invention respectively calibrates two cameras 12 in the periphery of the target board 10. The target board 10 has a plurality of known actual space coordinates. Two cameras 12 are calibrated respectively to decide the exact position of each camera 12. In Step S10, use the camera 12, which is to be calibrated, to acquire target image corresponding to the target board 10, which is within the imaging area of the camera 12. In Step S12, use rotation, translation, etc. to align the target image to a reference standard, acquire the corresponding relationship of the target image and the target board, and define a region of interest (ROI) above the target image, wherein ROI functions as a detected area. Defining ROI can accelerates the speed of image procession. Refer to FIGS. 4a-4d for the details of Step S12. As shown in FIG. 4a, the target image 20 acquired by the camera 12 is inclined slightly and needs to be calibrated with a reference standard. In FIG. 4a, a reference line 22 (a dotted line in the drawing) is used to exemplify the reference standard. In FIG. 4b, rotate the target image 20 to make the upper edge of the target image 20 parallel to the reference line 22. In FIG. 4c, translate the target image 20 downward to make the upper edge of the target image 20 coincide with the reference line 22. In FIG. 4d, select a region of interest (ROI) 24, which is above the reference line 22 and has a preset height and a preset width.

Figure 5:
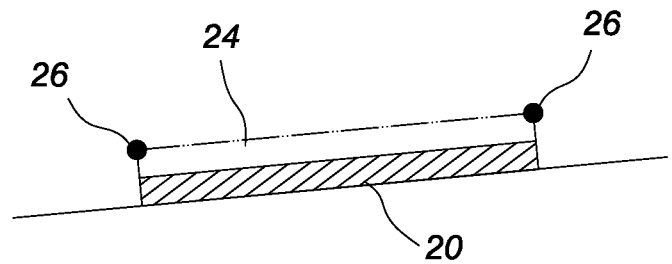
FIG. 5 is a diagram schematically showing that reference points are used in calibration according to one embodiment of the present invention.

In the rotation and translation for calibration in FIGS. 4a-4d, the angle and horizontal position of the target image 20 are modified with the reference line 22 being immobile so as to acquire the corresponding relationship of the target image and the target board and define ROI 24. In another embodiment, the angle and horizontal position of the reference line 22 is modified with the target image 20 being immobile to make the reference line 22 coincide with the upper edge of the target image 20. The abovementioned two embodiments can achieve the same objective. In one embodiment, the reference standard is at least two reference points, as shown in FIG. 5. In this embodiment, at least two reference points 26 are selected from two sides of a level, which is above the target image 20 and has an identical height with respect to the target image 20; then the coordinate system of the target image 20 is modified, and at least two reference points 26 are used to define ROI 24.

Figure 6:
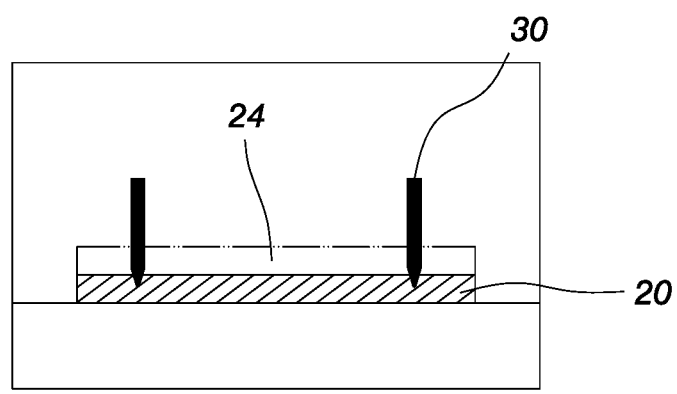
FIG. 6 is a diagram schematically showing an image of positioning markers inserted in a target board according to one embodiment of the present invention.
Figure 7:
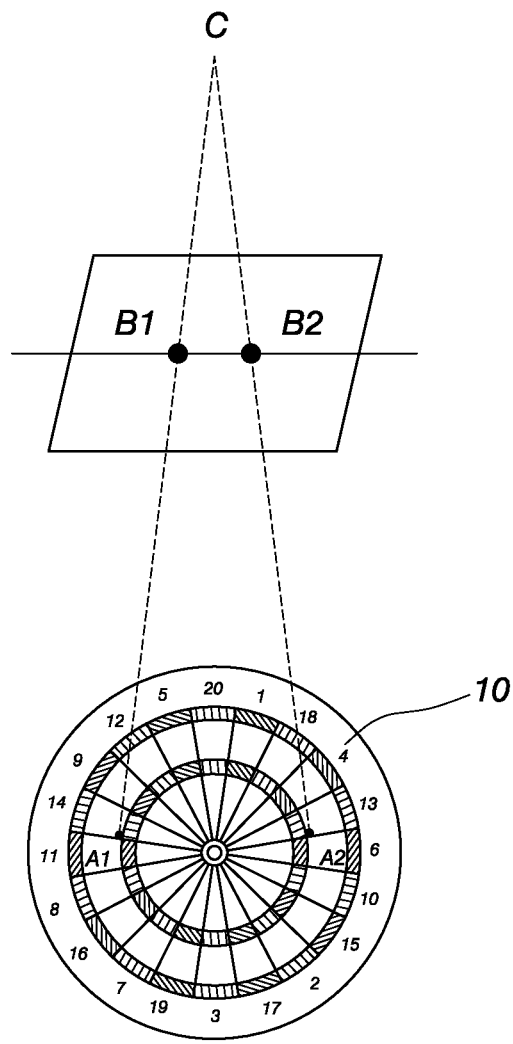
FIG. 7 is a diagram schematically showing the principle to acquire the exact positions of cameras to according to one embodiment of the present invention.

Refer to FIGS. 1-3 again. In Step S14, prepare at least one positioning marker. Herein, two needle-like objects 28 are used to exemplify the positioning markers. The two needle-like objects 28 are inserted into at least two positions of the target board 10, whose actual space coordinates are known. The camera 12 is used to acquire at least two images 30 of the needle-like objects 28 corresponding to ROI 24. Refer to FIG. 6. Next, at least two corresponding image coordinates are acquired according to the two images 30 of the needle-like objects 28. Refer to FIG. 7. In Step S16, use the existing technology and at least two known actual space coordinates A1 and A2 and at least two image coordinates B1 and B2, which are acquired beforehand, to work out the exact position of the camera 12, i.e. the point C shown in FIG. 7.

In the above embodiment, a plurality of positioning markers is simultaneously inserted into the target board to acquire the same number of sets of image coordinates at the same time. In another embodiment, one positioning marker is inserted into at least two positions having known actual space coordinates in sequence to acquire corresponding image coordinates one by one, which can also acquire sufficient image coordinates for working out the position of the camera. In some embodiments, the positioning markers are sequentially or simultaneously inserted into the target board while calibration is intended. In some embodiments, the positioning markers are fixedly inserted in the target board in advance before calibrations; the other steps of calibration are the same as those mentioned before and will not repeat herein. The present invention does not limit that the positioning marker must be a needle-like object. Other labels can also be used as the positioning markers as long as they can be discriminated in images.

In the cases that cameras are used to learn the impact points of arrows or darts for game scoring, it is a critical step to align the cameras parallel to the target board. The method of the present invention can indeed practice the critical step. The method of the present invention simplifies the 3D space relationship into a 2D problem and uses known actual space coordinates and acquired image coordinates to work out the exact positions of the cameras. Thereby, the accurate positions of the cameras can be used to correctly determine the positions of darts. Thus is avoided the scoring error and increased the scoring accuracy in dart games.

The embodiments have been described above to demonstrate the technical thoughts and characteristics of the present invention to enable the persons skilled in the art to understand, make, and use the present invention. However, these embodiments are only to exemplify the present invention but not to limit the scope of the present invention.

What is claimed is:

1. A calibration method for a camera which monitors a target board, which respectively calibrates at least two cameras disposed in a periphery of a target board having a plurality of known actual space coordinates, comprising steps:
    using said camera to acquire a target image corresponding to said target board;
    using rotation and translation to adjust a relative position of said target image and a reference standard to acquire a corresponding relationship of said target image and said target board and define a region of interest (ROI) above said target image according to the corresponding relationship of said target image and said target board; and
    utilizing at least one positioning marker in at least two positions of said target board, which have said known actual space coordinates, using said camera to acquire at least two image coordinates of said positioning markers with respect to said region of interest, and using at least two said known actual space coordinates and at least two said image coordinates to work out an exact position of said camera.

2. The calibration method for a camera which monitors a target board according to claim 1, wherein said reference standard is a reference line or at least two reference points.

3. The calibration method for a camera which monitors a target board according to claim 2, wherein in said step of using rotation and translation to adjust said relative position of said target image and said reference standard, a horizontal position and an angle of said reference line are adjusted to make said reference line coincide with a top edge of said target image to acquire said corresponding relationship of said target image and said target board and define said region of interest.

4. The calibration method for a camera which monitors a target board according to claim 2, wherein in said step of using rotation and translation to adjust said relative position of said target image and said reference standard, a horizontal position and an angle of said target image are adjusted to make a top edge of said target image coincide with said reference line to acquire said corresponding relationship of said target image and said target board and define said region of interest.

5. The calibration method for a camera which monitors a target board according to claim 2, wherein in said step of using rotation and translation to adjust said relative position of said target image and said reference standard, a coordinate system of said target image is adjusted to select said at least two reference points to acquire said corresponding relationship of said target image and said target board and define said region of interest.

6. The calibration method for a camera which monitors a target board according to claim 1, wherein said at least one positioning marker is sequentially inserted into said at least two positions of said target board, which have said known actual space coordinates, to acquire said image coordinates in sequence.

7. The calibration method for a camera which monitors a target board according to claim 1, wherein while said at least one positioning marker has a quantity of more than two, said positioning markers are simultaneously inserted into different positions of said target board, which have said known actual space coordinates, to acquire more than two said image coordinates at the same time.

8. The calibration method for a camera which monitors a target board according to claim 1, wherein said target board is an archery target board or a dartboard.

9. The calibration method for a camera which monitors a target board according to claim 8, wherein said dartboard is a dartboard of hard-type darts or a dartboard of soft-type darts.

10. The calibration method for a camera which monitors a target board according to claim 1, wherein said positioning marker is inserted into said target board fixedly in advance for calibration of said cameras.

* * * * *